US007672689B2

(12) United States Patent
Khlat et al.

(10) Patent No.: US 7,672,689 B2
(45) Date of Patent: Mar. 2, 2010

(54) MULTIPATH COMMUNICATIONS RECEIVER

(75) Inventors: Nadim Khlat, Cugnaux (FR); Patrick Clement, Bussigny (CH)

(73) Assignee: Freescale Semiconductor, Inc., Austin, TX (US)

( * ) Notice: Subject to any disclaimer, the term of this patent is extended or adjusted under 35 U.S.C. 154(b) by 653 days.

(21) Appl. No.: 10/433,855

(22) PCT Filed: Oct. 22, 2001

(86) PCT No.: PCT/EP01/12401

§ 371 (c)(1),
(2), (4) Date: Jun. 6, 2003

(87) PCT Pub. No.: WO02/47282

PCT Pub. Date: Jun. 13, 2002

(65) Prior Publication Data

US 2004/0038652 A1    Feb. 26, 2004

(30) Foreign Application Priority Data

Dec. 7, 2000    (EP) .................................. 00403443

(51) Int. Cl.
*H04M 1/00*    (2006.01)
(52) U.S. Cl. .................. 455/552.1; 455/553.1; 455/324
(58) Field of Classification Search ... 455/188.1–191.3, 455/139, 552.1–553.1, 168.1, 324, 313; 375/349
See application file for complete search history.

(56) References Cited

U.S. PATENT DOCUMENTS 5,794,159 A    8/1998    Portin
5,815,525 A *  9/1998    Smith et al. .................. 375/130
5,835,853 A * 11/1998    Enoki et al. .............. 455/180.1
5,999,990 A   12/1999    Sharrit et al.
6,029,052 A *  2/2000    Isberg et al. ................. 455/131
6,081,691 A *  6/2000    Renard et al. ............ 455/553.1
6,360,087 B1 * 3/2002    Rozenblit et al. ........... 455/324

(Continued)

FOREIGN PATENT DOCUMENTS

EP    0813312 B1    6/1997

(Continued)

OTHER PUBLICATIONS

Rahkonen, M. Neitola T.; An Analog Correlator for a WSDMA Receiver; IEEE International Symposium on cCircuits and Systems; May 28-31, 2000; pp. 753-756; XPO-02180132, Geneva, Switzerland.

(Continued)

*Primary Examiner*—Lana N Le (57) ABSTRACT

A multipath wideband communications receiver (100) having a plurality of RF signal paths (116, 136) covering different but overlapping frequency bands and a plurality of baseband signal paths (140, 150, 160, 170, 180, 190), the paths being re-configurable for sharing of the first and second paths in different ways in order to facilitate processing of received signals in different modes.

Also, a rake receiver (800) employs a sigma-delta modulator arrangement (810) and programmable delays to provide fine delay adjustment. The sigma-delta modulator (810) may use sigma-delta circuitry from a sigma-delta A/D converters in a baseband paths of the receiver (100), that this may be achieved with no loss of functionality if in a particular reception configuration that sigma-delta A/D converter is not being utilized.

15 Claims, 8 Drawing Sheets

U.S. PATENT DOCUMENTS

| | | | | |
|---|---|---|---|---|
| 6,381,471 B1 * | 4/2002 | Dvorkin | .................. | 455/552.1 |
| 6,606,485 B1 * | 8/2003 | Chen et al. | .................. | 455/140 |
| 6,643,522 B1 * | 11/2003 | Young | .................... | 455/552.1 |
| 6,766,178 B1 * | 7/2004 | Damgaard et al. | ....... | 455/552.1 |
| 7,260,416 B2 * | 8/2007 | Shippee | .................. | 455/552.1 |

FOREIGN PATENT DOCUMENTS

| | | | |
|---|---|---|---|
| EP | 1213844 B1 | | 12/2000 |
| EP | 0 756 391 | | 12/2001 |
| EP | 0798880 B1 | | 10/2006 |
| JP | 10-501382 | | 2/1998 |
| JP | 10-107678 | | 4/1998 |
| JP | 10-504698 | | 5/1998 |
| WO | WO 9201337 | A1 | 7/1991 |
| WO | WO 95133350 | | 12/1995 |
| WO | WO 99125075 | | 5/1999 |
| WO | WO 99/65154 | | 12/1999 |
| WO | WO 00/41322 | | 7/2000 |
| WO | WO 00/52840 | | 8/2000 |
| WO | WO 0051376 | | 8/2000 |

OTHER PUBLICATIONS

International Search Report, Jan. 21, 2003.

Noblet, C., Assessing the Over-The-Air Software Download for Reconfigurable Terminal, IEEE, Savoy Place, London WC2R OBL, UK, 6 pages, 1998.

Alsolaim, Ahmad, et al., Architecture and Application of a Dynamically Reconfigurable Hardware Array for Future Mobile Communication Systems, IEEE, 2000, pp. 205-214, 2000.

Munro, Alistair, Mobile Middleware for the Reconfigurable Software Radio, Software and DSP in Radio, IEEE, Aug. 2000, pp. 152-160.

International Search Report correlating to EPC 00403443.5 dated Oct. 29, 2001.

Office Action regarding EPC Application No. 00403443.5, Rejection dated Feb. 13, 2003.

Office Action regarding KORS Application No. 10-2003-7007657, Rejection dated Jul. 27, 2007.

Office Action regarding JAPA Application No. 2002-54887, Rejection dated Jan. 18, 2007.

Office Action regarding JAPA Application No. 2002-54887, Rejection Jun. 15, 2006.

Office Action regarding CHIN Application No. 01820152.0, Rejection dated Nov. 2, 2007.

Office Action regarding CHIN Application No. 01820152.0, Notice of Reexamination dated Sep. 19, 2008.

Office Action regarding CHIN Application No. 01820152.0, Rejection dated Dec. 8, 2006.

Office Action regarding CHIN Application No. 01820152.0, Rejection dated Jun. 29, 2007.

Riera-Palou, Reconfigurable Mobile Terminal Requirements for Third Generator Applications, 1999, IEEE, 9 pages.

Rahkonen, M. Neitola T.; An Analog Correlator for a WCDMA Receiver; IEEE International Symposium on Circuits and Systems, May 28-30, 2000, Geneva, Switzerland.

Jian, et al. "An Efficient IF Architecture for Dual-Mode GSM/W-CDMA Receiver of a Software Radio", National University of Singapore, IEEE 1991, pp. 21-24.

* cited by examiner

Medium-Band or Narrow-Band Mode + Bluetooth

MULTIPATH COMMUNICATIONS RECEIVER

FIELD OF THE INVENTION

This invention relates to communications receivers, and particularly to wireless communications receivers, such as mobile telephones.

BACKGROUND OF THE INVENTION

In the field of this invention it is known that it is desirable for wireless communications receiver to be capable of multi-mode operation (i.e., to be capable of operating in any one of a plurality of different modes, including both narrow- and wide-band modes—for example, 2G/2.5G/3G cellular modes ('2G', '3G' and '2.5G' referring respectively to cellular systems of second generation, third generation and intermediate therebetween) and GPS (Global Positioning by Satellite) mode).

In order to produce a multi-mode wireless communications receiver it would be possible to combine in one circuit separate receiver sections, each receiver section being dedicated to a limited number of modes. For example, a GSM receiver section could be combined with a WB-CDMA (WideBand-Code Division Multiple Access) receiver section to make a 3G/2G receiver). This approach has the advantage that would allow simultaneous multi-mode operation, but it has the disadvantage that it would not be cost-effective (it would contain many redundant blocks) for a limited flexibility (the resolution of pipelined A/D (Analog/Digital) converters usually used in a WB-CDMA receiver is difficult to extend beyond 10 bits) and would have a very high part count because the architectures of the individual receiver sections would be different (a superheterodyne receiver for one section, and a direct conversion receiver (DCR) for another section).

PRIOR ART

International Patent Application No WO-A1-0052840 (Conexant Systems Inc) describes a multi-band transceiver converts a received signal direct to a baseband frequency U.S. Pat. No. 5,999,990 (Motorola Inc) describes a reconfigurable communicator which is capable of being dynamically changed in order to process different tasks. A library of resources can be accessed in order to retrieve desired instructions for a particular task.

Although it would be possible to make a single receiver in which every circuit block is programmable, and such an approach would have the advantage of flexibility without redundancy, such an approach would have the disadvantage that it would not be able to support simultaneous multi-mode (which may be required in order to hand over seamlessly between two different modes).

A need therefore exists for a multipath communications receiver wherein the abovementioned disadvantage(s) may be alleviated.

STATEMENT OF INVENTION

In accordance with a first aspect of the present invention there is provided a multipath communications receiver as claimed in claim 1.

In accordance with a second aspect of the present invention there is provided a rake receiver for use in a communications receiver as claimed in claim 7.

BRIEF DESCRIPTION OF THE DRAWINGS

One multipath wideband communications receiver incorporating the present invention will now be described, by way of example only, with reference to the accompanying drawings, in which.

DESCRIPTION OF PREFERRED EMBODIMENT(S)

Figure 1:
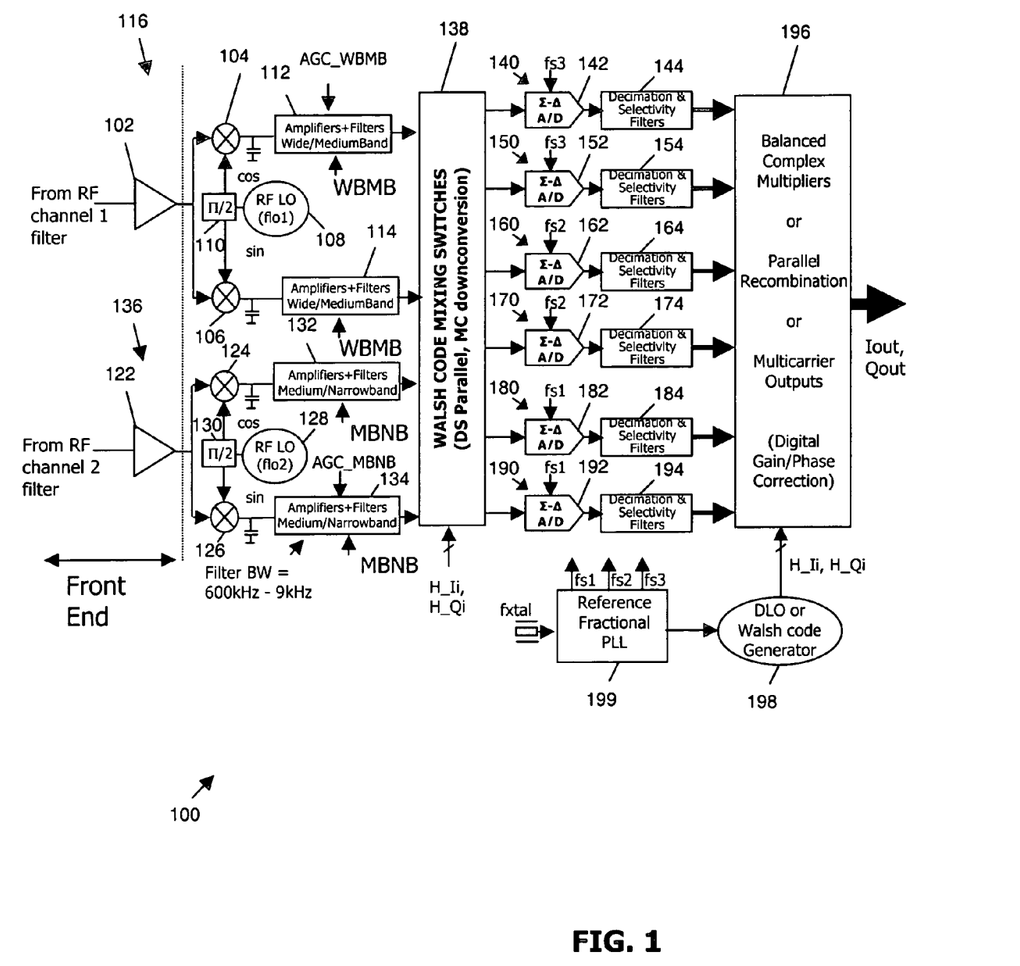
FIG. 1 shows a block schematic circuit diagram of the multipath wideband communications receiver.

Referring firstly to FIG. 1, a re-configurable multipath wideband communications receiver 100 has a first operational amplifier 102 for receiving an RF signal from a first RF channel filter (not shown). The output of the amplifier 102 is connected to mixers 104 and 106, whose other inputs are connected to receive opposite signals from a first RF local oscillator 108 via a phase splitter 110. The outputs of the mixers 104 and 106 (which, it will be appreciated, carry relative in-phase and quadrature-phase information from the received RF signal) are connected respectively to wide/medium-band amplifier/filter arrangements 112 and 114 (which will be discussed in greater detail below). It will thus be appreciated that the elements 102-114 represent an RF path 116.

A second operational amplifier 122 receives an RF signal from a second RF channel filter (not shown). The output of the amplifier 122 is connected to mixers 124 and 126, whose other inputs are connected to receive opposite signals from a second RF local oscillator 128 via a phase splitter 130. The outputs of the mixers 124 and 126 (which, it will be appreciated, carry relative in-phase and quadrature-phase information from the received RF signal) are connected respectively to a medium/narrow-band amplifier/filter arrangements 132 and 134 (which will be discussed in greater detail below). It will thus be appreciated that the elements 122-134 represent an RF path 136.

The outputs of the amplifier/filter arrangements 112, 114, 132 and 134 are connected to inputs of a Walsh code switching matrix 138 which performs any necessary down-conversion and, depending on the modulation mode(s) of the received RF signals, applies outputs (derived from its inputs) to relevant ones (as will be described in greater detail below) of six parallel baseband paths 140, 150, 160, 170, 180 and 190. It will be understood that although in this example Walsh coding is used, other types of coding may alternatively be used if desired. The baseband paths 140, 150, 160, 170, 180 and 190 each comprise a sigma-delta analogue-to-digital converter (142, 152, 162, 172, 182 and 192 respectively) and a decimation/selectivity filter arrangement (144, 154, 164, 174, 184 and 194 respectively). The outputs of the parallel baseband paths 140, 150, 160, 170, 180 and 190 are connected to inputs of a mixing matrix 196. The switching matrix 138 and the mixing matrix 196 are controlled by inputs from a coding generator (such as, for example, a Walsh code generator) 198. A reference phase-locked-loop 199 provides low-frequency signals fs1, fs2, etc. for clocking the sigma-delta analogue-to-digital converters 142, 152, 162, 172, 182 and 192.

It will be understood that as an alternative, the elements of the switching matrix 138 could be directly embedded in the sigma-delta analogue-to-digital converters (142, 152, 162, 172, 182, 192) of the parallel baseband paths (140, 150, 160, 170, 180, 190).

As will be explained in greater detail below, the receiver 100 can function as a multipath wideband receiver, with:
  use of a mixture of DCR (direct conversion reception) and DVLIF (digital very low intermediate frequency)—both of which terms are intended to be covered herein by the term DCR—allowing an efficient architecture requiring a low number of external components;
  the two parallel RF paths (116 and 136) and the six parallel baseband paths (140, 150, 160, 170, 180 and 190) allowing optimal multipath processing depending on the modulation scheme(s) of the received signal(s) (as will be described in more detail below);
  the two parallel RF paths (116 and 136) being dedicated to different (but overlapping) frequency ranges allowing simultaneous multi-mode operation with optimized programming ranges;
  the six parallel baseband paths (140, 150, 160, 170, 180 and 190) allowing A/D conversion with sigma-delta converters providing high resolution with low clock frequency (providing low power consumption and requiring no additional PLL); and
  the six parallel baseband paths (140, 150, 160, 170, 180 and 190) allowing handling of multi-carrier wide-band signals (e.g., one path per carrier) or simultaneous multi-mode operation (e.g., 2 paths for wide-band and 1 path for medium/narrow-band).

The table below shows the main receiver characteristics associated with various modes which can be supported by the receiver of FIG. 1.

| Standard | Mode | Bandwidth I or Q | Number of parallel ΣΔ A/D's | A/D Resolution | Sampling Frequency | Multi-mode (simultaneous: 2 Antennas) | Multi-mode (time-duplex) |
|---|---|---|---|---|---|---|---|
| WB-CDMA CDMA2000-DS | DCR | 1.92 MHz | 2 | 12 bits | 30.72 MHz | with GSM and GPS | with all modes |
| CDMA2000-MC | DCR | 3 × 625 KHz | 1 per carrier | 12 bits | 19.648 MHz | no | with all modes |
| CDMA | DCR | 625 KHz | 1 | 12 bits | 19.648 MHz | with GSM/EDGE, TDMA, iDEN, Bluetooth, GPS | with WB-CDMA |
| GSM/EDGE | DVLIF | 180 KHz | 1 | 13.5 bits | 13 MHz | with CDMA, TDMA, iDEN, Bluetooth, GPS | with WB-CDMA |
| TDMA | DVLIF | 30 KHz | 1 | 14.5 bits | 3.888 MHz | with CDMA, GSM/EDGE, iDEN, Bluetooth, GPS | with WB-CDMA |
| iDEN | DCR | 9 KHz | 1 | 15 bits | 8.4 MHz | with CDMA, GSM/EDGE, TDMA, Bluetooth, GPS | with WB-CDMA |
| Bluetooth | DCR | 600 KHz | 1 | 9-10 bits | 6-13 MHz | with CDMA, GSM/EDGE, TDMA, iDEN, GPS | with WB-CDMA |
| GPS | DCR | 750 KHz | 1 | 10 bits | 24.552 MHz | | with ALL MODES |

Figure 2:
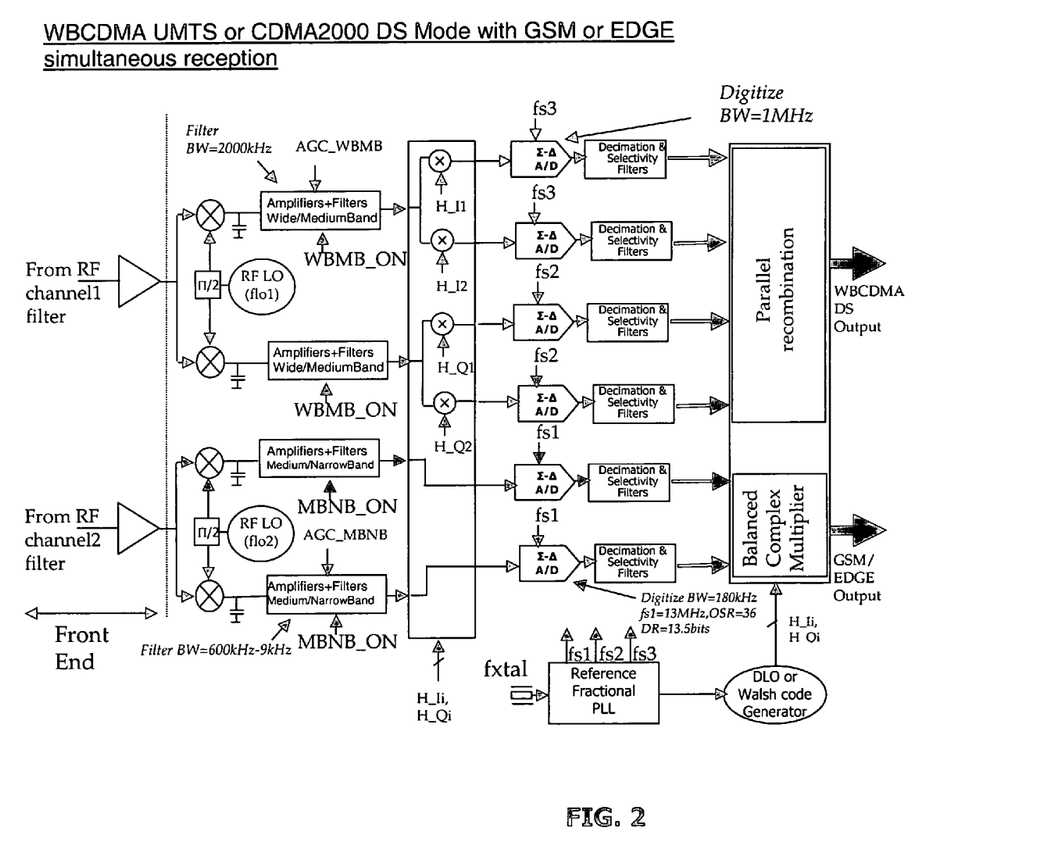
FIG. 2 shows a block schematic circuit diagram of the multipath wideband communications receiver of FIG. 1, configured for simultaneous reception and processing of signals in WBCDMA UMTS or CDMA2000 DS mode and GSM or EDGE mode.

Referring now to FIG. 2, in the configuration shown therein the receiver of FIG. 1 supports WBCDMA UMTS or CDMA2000 DS Mode with GSM or EDGE simultaneous reception.

The Wide/Medium-Band path is set to approx. 2 MHz bandwidth. Two parallel sigma-delta converters are used for the WBCDMA DS mode. One-bit switch control signals (+1 or −1) are provided at the Sigma-Delta inputs. Operation is in DCR mode. The Medium/Narrow-Band path is set to approx. 500 kHz bandwidth. One sigma-delta converter is used for GSM/EDGE operation. Operation is in Digital Very Low IF mode.

Figure 3:
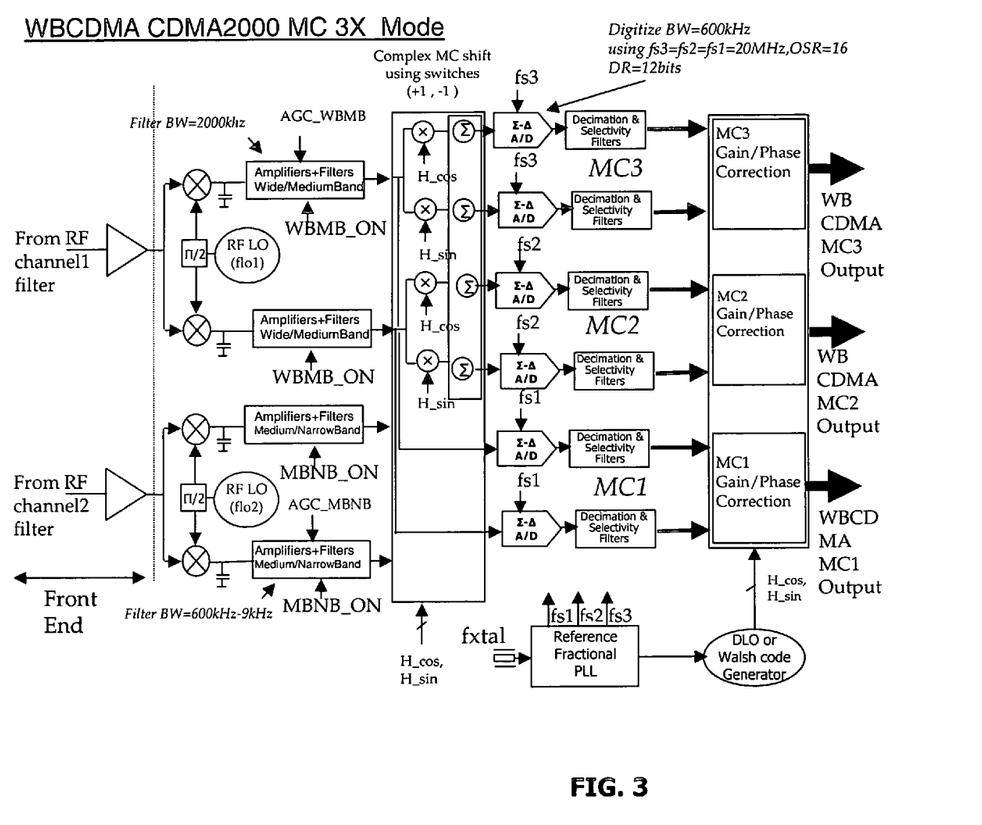
FIG. 3 shows a block schematic circuit diagram of the multipath wideband communications receiver of FIG. 1, configured for reception and processing of signals in WBCDMA 2000 MC mode.

Referring now to FIG. 3, in the configuration shown therein the receiver of FIG. 1 supports WBCDMA CDMA2000 MC 3× Mode. The Wide/Medium-Band path is set to approx. 2 MHz bandwidth. One-bit clock switch control signals (+1 or −1) are provided at the Sigma-Delta inputs. Complex down-conversion for multicarrier frequency is performed (fmc=1.22 Mhz where H_cos is at carrier frequency with two levels (+1, −1) and H_sin is a pi/2 shift versus H_cos). The spur response is at 3*fmc where filtering is provided earlier in the flow. It is also possible to use a two-level modulation using Walsh code or similar sequences to reduce the level of spur response by switching the capacitors values of the sampling circuitry at fmc rate. Complex down-conversion uses I and Q. Each Sigma-Delta modulator is used to digitize a multicarrier channel on 12 bits at least.

Figure 4:
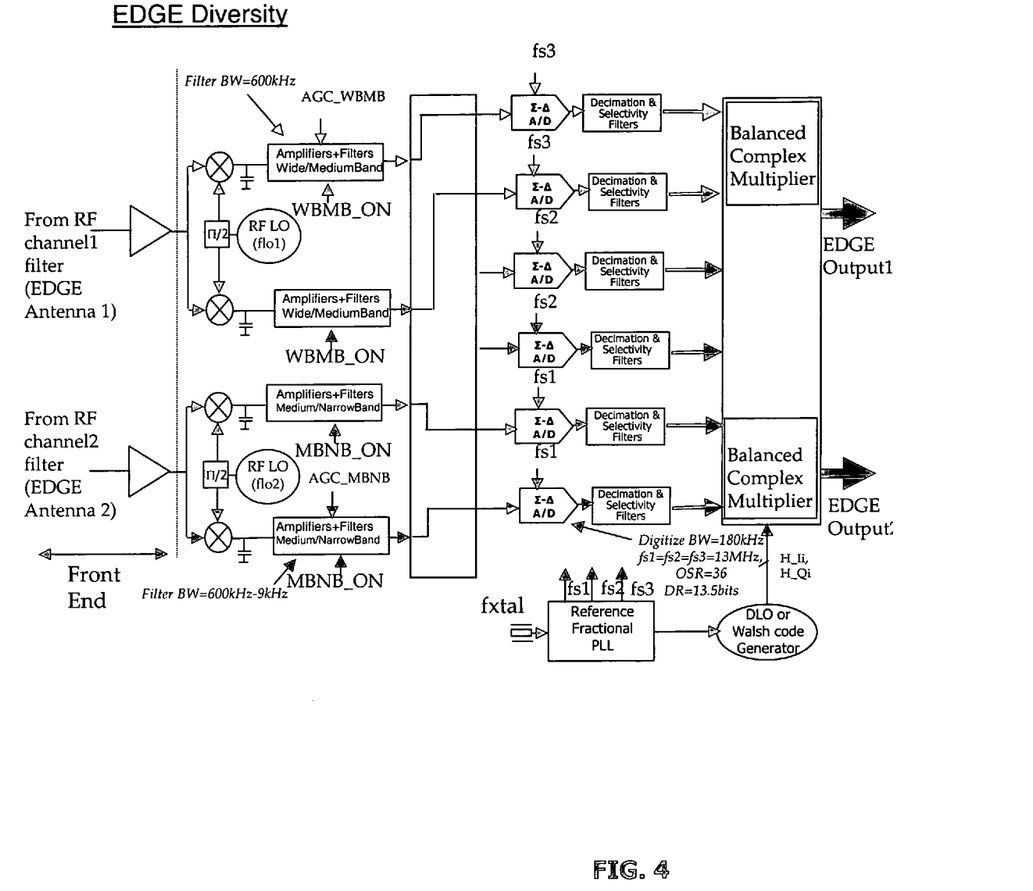
FIG. 4 shows a block schematic circuit diagram of the multipath wideband communications receiver of FIG. 1, configured for simultaneous reception and processing of EDGE signals received at different antennas to achieve diversity.

Referring now to FIG. 4, in the configuration shown therein the receiver of FIG. 1 EDGE diversity reception, with both RF channels receiving EDGE signals received at different antennas.

Figure 5:
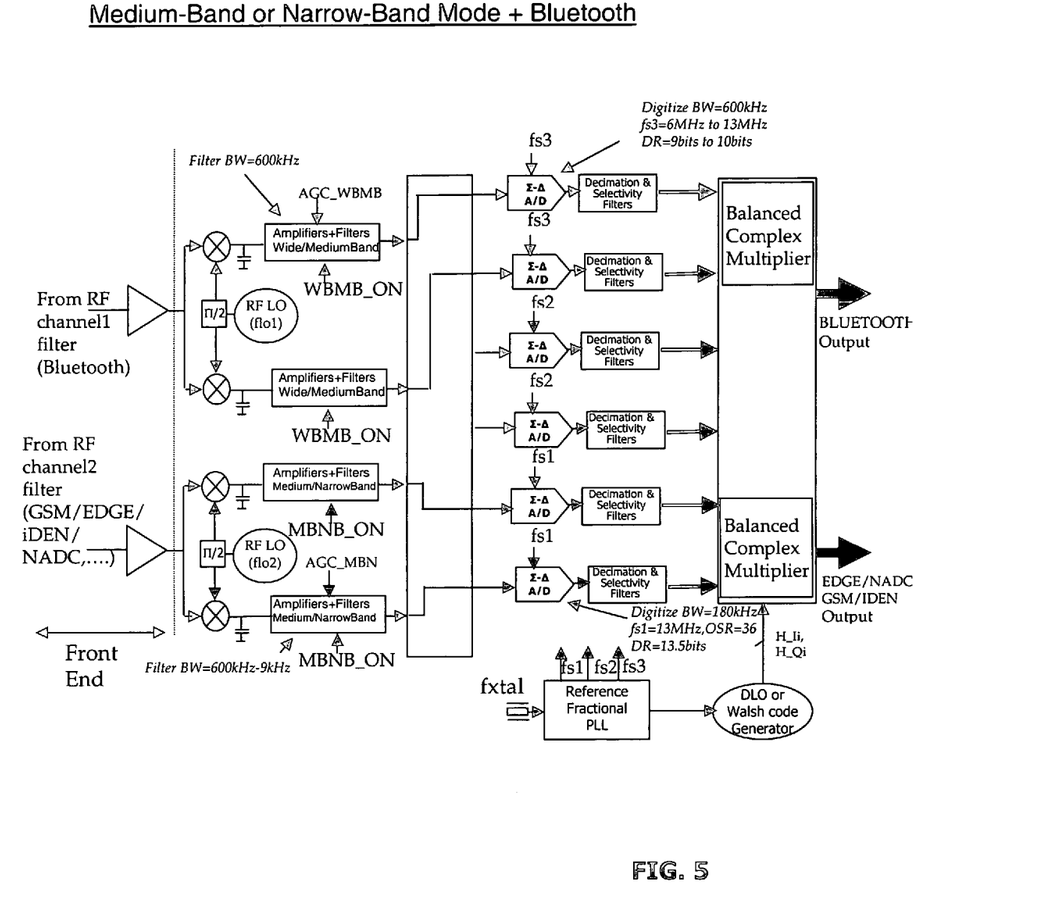
FIG. 5 shows a block schematic circuit diagram of the multipath wideband communications receiver of FIG. 1, configured for simultaneous reception and processing of signals in medium-band/narrow-band mode and Bluetooth mode.

Referring now to FIG. 5, in the configuration shown therein the receiver of FIG. 1 supports simultaneous Medium/Narrow-Band Mode on one RF channel and Bluetooth mode on the other RF channel.

Figure 6:
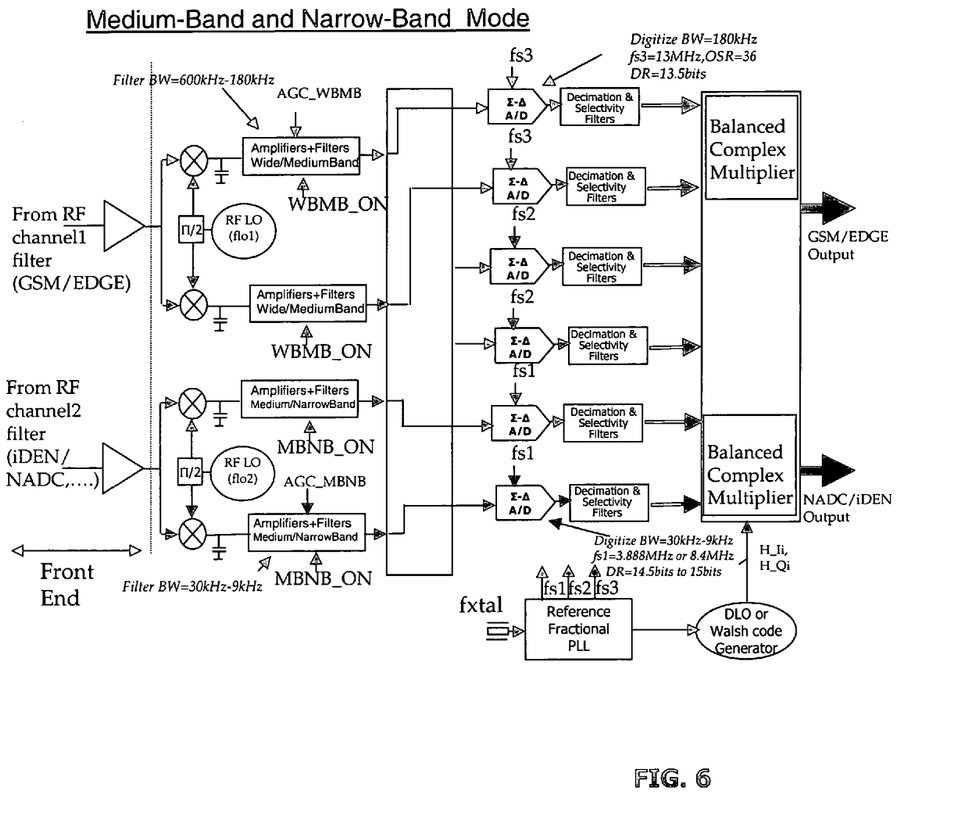
FIG. 6 shows a block schematic circuit diagram of the multipath wideband communications receiver of FIG. 1, configured for simultaneous reception and processing of signals in wide-band mode and medium-band mode.

Referring now to FIG. 6, in the configuration shown therein the receiver of FIG. 1 supports simultaneous Medium-Band Mode on one RF channel and Narrow-Band mode on the other RF channel.

Figure 7:
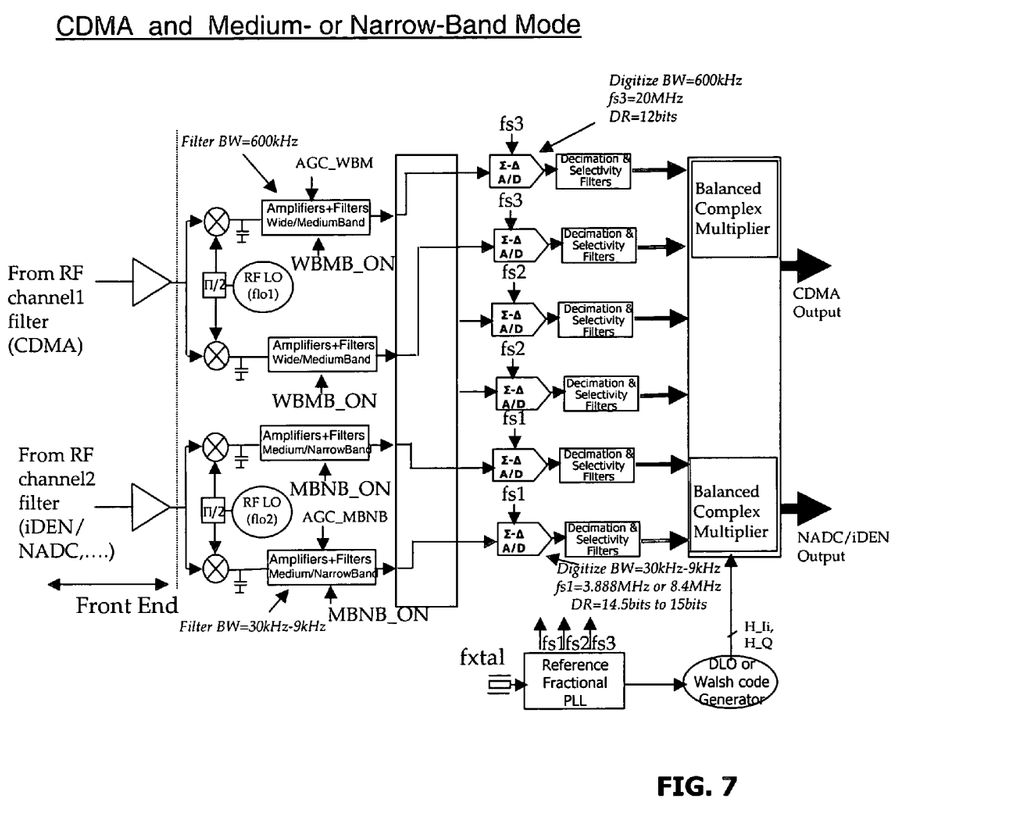
FIG. 7 shows a block schematic circuit diagram of the multipath wideband communications receiver of FIG. 1, configured for simultaneous reception and processing of signals in CDMA mode and medium/narrow-band mode.

Referring now to FIG. 7, in the configuration shown therein the receiver of FIG. 1 supports simultaneous CDMA mode on one RF channel and Medium/Narrow-Band mode on the other RF channel.

Figure 8:
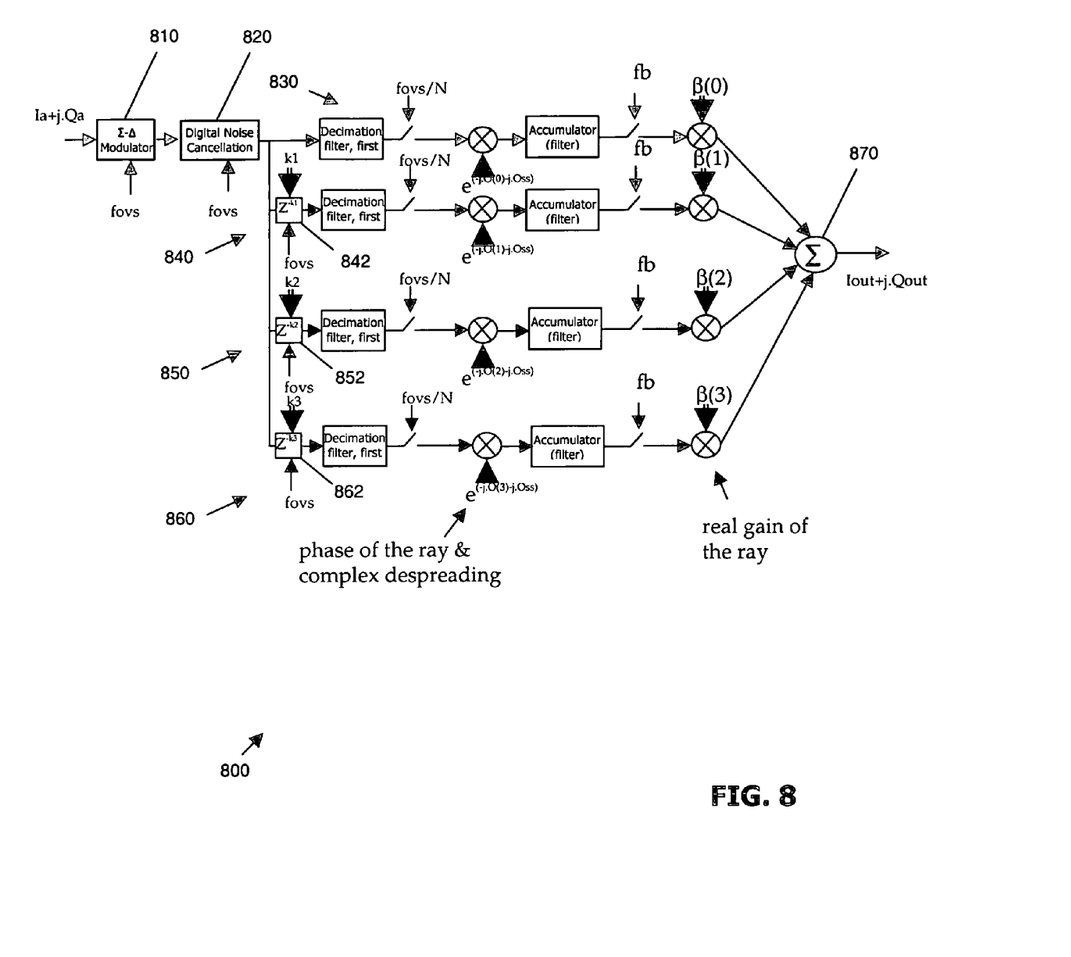
FIG. 8 shows a block schematic circuit diagram of a rake receiver which may advantageously be utilised in the multipath wideband communications receiver of FIG. 1.

Referring now to FIG. 8, a rake receiver 800 which may be advantageously used in the receiver of FIG. 1 is shown. The rake receiver 800 has a Sigma-Delta modulator 810 for receiving a signal to be rake filtered. The output of the Sigma-Delta modulator 810 is applied via a digital noise cancellation arrangement 820 to inputs of four parallel signals paths 830, 840, 850 and 860. All except one of the parallel signals paths 830, 840, 850 and 860 has its own respective programmable delay (842, 852, 862) and each of the paths includes a decimation filter, a first mixer, an accumulator filter and a second mixer. The outputs from each of the parallel signals paths 830, 840, 850 and 860 combined in a combiner 870 to produce the rake output.

It will be understood that, by utilizing the sigma-delta modulator arrangement 810 and programmable delays, the rake filter 800 can provide fine delay adjustment. It will further be appreciated that the sigma-delta modulator 810 may use the sigma-delta circuitry from one of the sigma-delta A/D converters (142, 152, 162, 172, 182 and 192) provided in the baseband paths of the receiver of FIG. 1, and that this may be achieved with no loss of functionality if in a particular reception configuration that sigma-delta A/D converter is not being utilized.

It will, of course, be appreciated that the present invention and the above-described embodiment(s) lend themselves readily to use in integrated circuit form, embodied in an arrangement of one or more integrated circuits, where many of the invention's advantages assume greater significance.

The invention claimed is:

1. A multipath communications receiver, comprising:
   at least one first path for processing received signals having signal bandwidth in a first frequency bandwidth range;
   at least one second path for processing received signals having signal bandwidth in a second frequency bandwidth range which is different from but overlaps the first frequency bandwidth range;
   the first and second paths employing direct conversion/low-IF processing means for processing received signals, and the first and second paths being re-configurable for sharing of the first and second paths in different ways in order to facilitate parallel processing of received signals in different modes.

2. The multipath communications receiver of claim 1, wherein the first frequency bandwidth range covers wide-band and medium-band bandwidths and the second frequency band covers medium-band and narrow-band bandwidths.

3. The multipath communications receiver of claim 1, further comprising a plurality of parallel baseband paths each employing sigma-delta analogue-to-digital conversion means arranged re-configurably to process in two shared said baseband paths a signal received in wide-band mode or to process simultaneously in two said baseband paths in parallel a first signal received in a first frequency band in a first mode and a second signal received in a second frequency band in a second mode.

4. The multipath communications receiver of claim 3, wherein the receiver comprises six said parallel baseband paths.

5. A multipath communications receiver as claimed in claim 3 further comprising a rake receiver having:
   sigma-delta modulator means for receiving an input signal to be rake-filtered;
   a plurality of parallel delay paths, comprising delay means and filter means, for receiving the output of the sigma-delta modulator means and for producing respective delayed and filtered outputs; and
   combining means for combining the outputs of the plurality of parallel delay paths.

6. The multipath communications receiver of claim 5 wherein the sigma-delta modulator means are arranged to be provided by re-configuration of the sigma-delta analogue-to-digital conversion means of at least one of said parallel baseband path.

7. The multipath communications receiver of claim 1, wherein the receiver is arranged to receive and process a received signal in at least one of the following modes: wide-band CDMA2000, CDMA2000, CDMA, UMTS, GSM/EDGE, TDMA, iDEN, Bluetooth, GPS.

8. An integrated circuit arrangement for use in a multipath communications receiver, the integrated circuit arrangement comprising:
   at least one first path for processing received signals having signal bandwidth in a first frequency bandwidth range;
   at least one second path for processing received signals having signal bandwidth in a second frequency bandwidth range which is different from but overlaps the first frequency bandwidth range;
   the first and second paths employing direct conversion/low-IF processing means for processing received signals, and the first and second paths being re-configurable for sharing of the first and second paths in different ways in order to facilitate parallel processing of received signals in different modes.

9. A multipath communications receiver, comprising:
   at least one first path for processing received signals having signal_bandwidth in a first frequency bandwidth range;
   at least one second path for processing received signals having signal_bandwidth in a second frequency bandwidth range which is different from but overlaps the first frequency bandwidth range;
   the first and second paths are arranged to provide direct conversion/low-IF processing for processing received signals, and the first and second paths being re-configurable for sharing of the first and second paths in different ways in order to facilitate parallel processing of received signals in different modes.

10. The multipath communications receiver of claim 9, wherein the first frequency bandwidth range covers wideband and medium-band bandwidths and the second frequency band covers medium-band and narrow-band bandwidths.

11. The multipath communications receiver of claim 9, further comprising a plurality of parallel baseband paths each employing a sigma-delta analogue-to-digital converter arranged re-configurably to process in two shared said baseband paths a signal received in wide-band mode or to process simultaneously in two said baseband paths in parallel a first signal received in a first frequency band in a first mode and a second signal received in a second frequency band in a second mode.

12. The multipath communications receiver of claim 11, wherein the receiver comprises six said parallel baseband paths.

13. A multipath communications receiver as claimed in claim 11 further comprising a rake receiver having:

sigma-delta modulator for receiving an input signal to be rake-filtered;

a plurality of parallel delay paths, comprising a respective delay and a respective filter, for receiving the output of the sigma-delta modulator and for producing respective delayed and filtered outputs; and combiner for combining the outputs of the plurality of parallel delay paths.

14. The multipath communications receiver of claim 13 wherein the sigma-delta modulator is arranged to be provided by re-configuration of the sigma-delta analogue-to-digital converter of at least one of said parallel baseband paths.

15. The multipath communications receiver of claim 9, wherein the receiver is arranged to receive and process a received signal in at least one of the following modes: wideband CDMA2000, CDMA2000, CDMA, UMTS, GSM/EDGE, TDMA, iDEN, Bluetooth, GPS.

* * * * *